United States Patent

Argabright et al.

[15] 3,684,807

[45] Aug. 15, 1972

[54] METHOD OF PREPARING ISOCYANURATES

[72] Inventors: Perry A. Argabright, 900 Cottonwood Ave., Littleton, Colo. 80120; Charles H. Depuy, 1509 Cascade Ave., Boulder, Colo. 80302

[22] Filed: May 18, 1970

[21] Appl. No.: 38,554

Related U.S. Application Data

[63] Continuation-in-part of Ser. No. 682,542, Nov. 13, 1967, abandoned.

[52] U.S. Cl. ............................................260/248 NS
[51] Int. Cl. ..............................................C07d 55/38
[58] Field of Search................................260/248 NS

[56] References Cited

UNITED STATES PATENTS

| | | |
|---|---|---|
| 2,536,849 | 1/1951 | Kaiser et al.................260/248 |
| 2,866,801 | 12/1958 | Himel et al. ...........260/248 X |
| 3,108,100 | 10/1963 | Tate et al....................260/248 |
| 3,211,704 | 10/1965 | Gilman et al. ..........260/248 X |
| 3,458,448 | 7/1969 | Argabright et al.....260/248 X |
| 3,549,630 | 12/1970 | Argabright et al.........260/248 |
| 3,578,662 | 5/1971 | Cornell......................260/248 |

OTHER PUBLICATIONS

Fukui et al., Bull. Chem. Soc., Japan, Vol. 38, pp. 1586– 1589 (1965)

Argabright et al., J. Org. Chem., Vol. 30, pp. 3317– 3321 (1965)

*Primary Examiner*—John M. Ford
*Attorney*—Joseph C. Herring, Richard C. Willson, Jr., Jack L. Hummel and Wallenstein, Spangenberg, Hattis & Strampel

[57] ABSTRACT

A method of preparing isocyanurates, particularly unsymmetrically trisubstituted isocyanurates, comprising forming a reaction mixture of an organic isocyanate, an organic halide and an alkali or alkaline earth metal cyanate, and carrying out the reaction between the isocyanate, the halide and the metal cyanate in the presence of an aprotic dipolar solvent at a temperature in the range of from about 25°C to about 300°C. Pressures of the order of about 0.1 to 30 atmospheres and an inert atmosphere advantageously are employed in carrying out the reaction. The products may be used as intermediates in the production of pharmaceuticals, insecticides, disinfectants, and in the preparation of polymers.

10 Claims, No Drawings

METHOD OF PREPARING ISOCYANURATES

This application is a continuation-in-part application of copending application Ser. No. 682,542, filed Nov. 13, 1967 now abandoned.

The present invention relates to a method of preparing isocyanurates, and, in particular, relates to a method preparing unsymmetrically trisubstituted isocyanurates. Heretofore, the synthesis of unsymmetrically trisubstituted isocyanurates of the type corresponding generally to the formula,

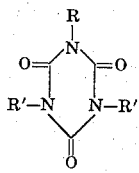

where R and R' may be aliphatic or aromatic radicals as described in greater detail hereinafter, has been accomplished by one of two methods. Perhaps the more commonly employed method of the two is the base catalyzed cotrimerization of two isocyanates of the type RNCO and R'NCO. This method is disclosed in an article entitled "Vinyl Isocyanurates, Preparation of Alkenyl Isocyanurates by Trimerization or Cotrimerization of Isocyanates" by E. C. Juenge and W. C. Francis, Journal of Organic Chemistry, Vol. 26, September 1961, pages 3334–3337. The method suffers from a significant disadvantage in that it leads to the production of complex reaction mixtures containing near statistical distributions of all of the possible trisubstituted isocyanurates. Isolation of the desired unsymmetrically trisubstituted isocyanurate from this spectrum of mixed isocyanurates is difficult, and yields, owing to the inherent randomness of the reactions, are low. The second method employed for synthesizing isocyanurates of the type here under consideration is disclosed in an article entitled "Organometalic Reactions. Part III. Trimerization of Isocyanates by Organotin Alkoxides and Oxides" by A. J. Bloodworth and A. G. Davies, Journal of the American Chemical Society, Vol. 82, 1965, pages 6858–6863. The article shows the preparation of diethyl phenyl isocyanurate from the sequential reaction of ethyl isocyanate and phenyl isocyanate with a trialkyltin oxide. Apart from the low yields obtained, the method is inefficient and complex.

The method of the present invention enables unsymmetrically trisubstituted isocyanurates to be prepared directly and selectively, in excellent yields, in essentially a single step. A simple water extraction is employed to separate the major by-products formed during the reaction from the desired, water-insoluble isocyanurate. Purification of the unsymmetrically trisubstituted isocyanurates, if called for, can be achieved by recrystallization from a suitable organic solvent. The starting materials utilized in the method are readily available and inexpensive, and the conditions under which the method is carried out are such that no specialized equipment is required. The products produced by the method generally have excellent thermal stability, and may be used for many different purposes, some of which are as intermediates in the production of pharmaceuticals, insecticides, disinfectants, and in the preparation of polymers. Thus, for instances, products of the structural formula

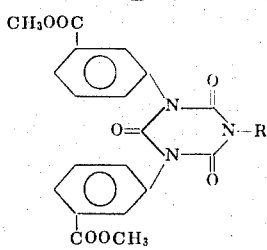

wherein R is an aryl, alkyl, or aralkyl group, can be used in the preparation of polymers with excellent inherent UV absorbence. The above compound is synthesized in accordance with the present invention by first preparing the metallic bis(p-carbomethoxyphenyl) isocyanurate followed by reaction with a suitable organic halide, i.e., benzyl chloride.

Briefly, the method of this invention comprises forming a reaction mixture of an organic isocyanate, an organic halide and an alkali or alkaline earth metal cyanate, and reacting the isocyanate, the halide and the metal cyanate in the presence of an aprotic dipolar solvent. Heat and pressure advantageously are applied during the reaction.

The reaction involved in the synthesis of unsymmetrically trisubstituted isocyanurates by the method of the present invention may be represented by the following equation:

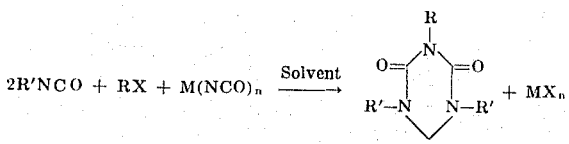

wherein R and R' can be either unsubstituted hydrocarbon radicals or substituted hydrocarbon radicals containing groups selected from the following: nitro, nitroso, cyano, alkoxy, aryloxy, alkylthio, arylthio, aryl, keto, carboalkoxy, formyl, secondary amino, sulfoxide, sulfone, sulfonate, sulfonate esters, disubstituted phosphiono ($R_2P-$), urethane, urea, amide, imide, or combinations thereof; X is a halogen, especially chlorine, bromine or iodine; M is an alkali or alkaline earth metal; and $n$ is the oxidation number of the metal ion comprising the metal cyanate. R and R', of course, are different.

The proportions of organic isocyanate, organic halide and metal cyanate employed in carrying out the reaction to produce a preselected unsymmetrically trisubstituted isocyanurate in accordance with the practice of this invention are somewhat variable. The generally optimum objectives of the invention, however, are most advantageously achieved with approximately stoichiometric or theoretical proportions of the reactants, that is, an organic isocyanate to organic halide to metal cyanate ratio of about 2:1:1. The quantity of solvent used also is variable. From a practical standpoint, only so much of the solvent need be employed as is required to facilitate both maintenance of the desired temperature conditions and work up of the unsymmetrically trisubstituted isocyanurate. Generally speaking, the quantity of solvent used will range from about 0.5 to about 20, usually about 1 to about 5, liters per mole of organic halide employed.

The organic isocyanates corresponding to the formula R'NCO having utility in the practice of the method of the present invention can be selected from a wide group. Included in this group are aliphatic isocyanates and aromatic isocyanates, wherein, as stated, R' can be either an unsubstituted or substituted hydrocarbon radical. Exemplary of isocyanates that can be used to prepare unsymmetrically trisubstituted isocyanurates by the method are straight or branched chain alkyl isocyanates such as methyl isocyanate, ethyl isocyanate, propyl isocyanate, isopropyl isocyanate, butyl isocyanate, isobutyl isocyanate, amyl isocyanate, isoamyl isocyanate, cyclopentyl isocyanate, octyl isocyanate, isooctyl isocyanate, dodecyl isocyanate, tetradecyl isocyanate, hexadecyl isocyanate, octadecyl isocyanate, ethylurea isocyanate, and the like; alkene isocyanate, including propylene isocyanate, isopropylene isocyanate, butylene isocyanate, amylene isocyanate, allyl isocyanate, crotyl isocyanate, 2-methyl-allylisocyanate, cyclopentadienyl isocyanate, and the like; alkyne isocyanates exemplified by propyne isocyanate, butyne isocyanate, pentyne isocyanate, and the like; aromatic isocyanates including carbocyclic aryl and carbocyclic aralkyl isocyanates such as phenylisocyanate, tolyisocyanate, xylylisocyanate, p-nitrophenylisocyanate, p-chlorophenylisocyanate, p-methoxyphenylisocyanate, p-ethoxyphenylisocyanate, diphenylisocyanate, diphenylurethan isocyanate, naphthylisocyanate, 4-nitronaphthylisocyanate, benzylisocyanate, p-nitrobenzylisocyanate, p-methoxybenzylisocyanate, p-chlorobenzylisocyanate, naphthobenzylisocyanate, 4-nitronaphthobenzylisocyanate, 4-methoxynaphthobenzylisocyanate, and the like.

The organic halides corresponding to the formula RX useful in the preparation of unsymmetrically trisubstituted isocyanurates by the method of this invention likewise can be selected from a wide group. The organic halides include unsubstituted and substituted aliphatic and aromatic halides which can be characterized in that, in the case of aliphatic halides, the halogen substituent is terminal or in a position such that displacement thereof will not be hindered by steric or other factors, and, in the case of aromatic halides, the halogen substituent is not attached directly to the aromatic ring but to a substituent on the ring. Exemplary of organic halides useful in carrying out the method of this invention are straight or branched chain alkyl halides wherein the alkyl group contains from one to 30 carbon atoms, especially desirably from one to 12 carbon atoms, and preferably from one to six carbon atoms, specific examples of which are methyl chloride, methyl bromide, methyl iodide, ethyl chloride, ethyl bromide, ethyl iodide, propyl chloride, propyl bromide, propyl iodide, isopropyl chloride, isopropyl bromide, isopropyl iodide, 1-methoxy-3-chloropropane, 1-ethoxy-3-chloropropane, butyl bromide, isobutyl iodide, 3-methyl-1-chloro-butane, amyl chloride, amyl bromide, amyl iodide, isoamyl chloride, isoamyl bromide, chlorocyclopentane, bromocyclopentane, octyl chloride, octyl bromide, octyl iodide, isooctylchloride, dodecyl chloride, dodecyl bromide, dodecyl iodide, tetradecyl chloride, tetradecyl bromide, tetradecyl iodide, cetyl bromide, octadecyl bromide, and the like; alkene halides such as allyl chloride, allyl bromide, allyl iodide, 3-chloro-1-butnee, crotyl chloride, crotyl bromide 2-methylallylchloride, 2-methyl-allylbromide, 2-ethyl-allylchloride, 2-ethyl-allylbromide, cyclopentadienyl chloride, and the like; alkyne halides exemplified by 3-chloro-1-propyne, 3-bromo-1-propyne 3-iodo-1-propyne, 4-chloro-1-butyne, 4-bromo-1-butyne, 4-iodo-1-butyne, 5-chloro-1-pentyne, 5-bromo-1-pentyne, 5-iodo-1-pentyne, and the like; aralkyl halides including benzyl chloride, benzyl bromide, 4-methoxybenzyl chloride, 4-ethoxybenzyl bromide, 4-chlorobenzyl chloride, nitrobenzyl chloride, 1-chloromethylnaphthalene, β-chloroethylnaphthalene, and the like.

The metal cyanates employed in carrying out the method of this invention comprise alkali and alkaline earth metal cyanates. Exemplary thereof are sodium cyanate, potassium cyanate, lithium cyanate, rubidium cyanate, cesium cyanate, calcium cyanate, barium cyanate, strontium cyanate, magnesium cyanate and beryllium cyanate.

As indicated, the reaction between the organic isocyanate, the organic halide and the metal cyanate is carried out in the presence of an aprotic dipolar solvent. The aprotic solvents having utility in this connection are characterized in that (1) they are liquid under the conditions of the reaction; (2) they have a high dielectric constant, i.e., greater than about 15 at 25°C; (3) they are dipolar, that is, one part of the molecule has a more positive electrical charge relative to the other parts of the molecule thereby causing the molecule to act as a dipole; (4) they are sufficiently inert not to enter into deleterious side reactions to any appreciable extent under the conditions of the reaction; and (5) they do not possess hydrogen atoms capable of hydrogen bonding with or transferring to anions in solution in the reaction mixture. A mixture of solvents satisfying the foregoing criteria can, of course, be employed. Exemplary of solvents useful in carrying out the method are alkyl pyrrolidones such as N-methylpyrrolidone-2 and N-ethylpyrrolidone-2; sulfoxides exemplified by dimethylsulfoxide and diethylsulfoxide; alkyl amides including N, N-dimethylformamide, N, N-diethylformamide, N, N-dimethylacetamide and N, N-diethylacetamide; alkylphosphoramides and arylphosphoramides such as hexamethylphosphoramide, hexaethylphosphoramide, and hexaphenylphosphoramide; nitriles examples of which are acetonitrile and benzonitrile; alkylureas such as tetramethylurea and tetraethylurea; and the like; and compatible mixtures thereof.

The temperatures utilized in forming unsymmetrically trisubstituted isocyanurates in accordance with the practice of the present invention can range from about 25°C to about 300°C. In most instances, however, it is preferred to use temperatures in the range of from about 75°C to about 200°C. Depending upon the temperature employed and the reactivity of the organic isocyanate and/or the organic halide used, the time required to carry out the method may vary from about 0.1–48 hours, with the objectives of the invention generally being attainable in from about 1 to about 8 hours.

The formation of the unsymmetrically trisubstituted isocyanurates is enhanced, augmented and promoted by the utilization of pressure in conjunction with an inert atmosphere. Pressures employed can range from about 0.1 to about 30 atmospheres. Depending upon the nature of the halide and solvent employed, and the temperature used, pressures in the range of from about 1 to about 10 atmospheres, generally speaking, are adequate for the purposes of the present invention. An inert atmosphere in which to carry out the reaction can be provided by conventional techniques employing known gases such as nitrogen, argon, helium, or the like.

In order that the full details of the present invention will be even better understood, the following examples are provided. These examples are illustrative of the practice of the method of the invention and it should be understood that variations may be made therein in a number of particulars without in any way departing from the fundamental principles and teachings provided herein. The examples, therefore, are not to be construed in any way as limitative of the scope of the invention.

EXAMPLE I

A mixture of 9.52g (0.08 mole) phenylisocyanate, 5.06g (0.04 mole) benzyl chloride and 3.12g (0.048 mole) sodium cyanate in 250 ml of dry dimethylformamide (DMF) is charged to a 500 ml three-necked flask equipped with a thermoregulator, stirrer, reflux condenser and a means for maintaining a nitrogen atmosphere. The contents are heated at 100°C for 16 hours, cooled to room temperature, poured into water and the resulting solid product collected by filtration. The weight of the crude solid product is 14.1g. One recrystallization from ethanol provides an 84 percent yield of pure 1-benzyl-3, t-diphenyl isocyanurate, m.p. 246.0–246.5C.

EXAMPLE II

In a manner similar to Example I, a mixture of 9.52g (0.08 mole) phenylisocyanate, 5.95g (0.04 mole) l-chlorooctane and 3.24g (0.04 mole) KNCO in 250 ml of DMF is heated at 100°C for 64 hours. The product is isolated as in Example I and recrystallized from 95 percent ethanol to give a 33.2 percent yield of 1,3-diphenyl-5-octyl isocyanurate, m.p., 118.5°–119.5°C. The structure is proved by infrared, n.m.r. and elemental analyses. It should be noted that the major by-product is potassium diphenyl isocyanurate which, as indicated, is readily separated from the 1,3-diphenyl-5-octyl isocyanurate by a simple water extraction, the 1,3-diphenyl-5-octyl isocyanurate being insoluble in water.

EXAMPLE III

Under reaction conditions identical to those employed in Example I, a number of isocyanates are selectively cotrimerized with benzyl chloride. The results are tabulated below:

EXAMPLE IV

To a rapidly stirred slurry of 13.0g KNCO (0.16 mole) in 200 ml dry DMF maintained at 75° C is added (dropwise over a period of 1 hour) a solution of 11.5g allyl chloride (0.15 mole) and 35.7g phenyl isocyanate (0.30 mole) in 100 ml of DMF. After the addition is complete, the mixture is allowed to react an additional one-half hour. The desired product, diphenyl allyl isocyanurate, was obtained in 92 percent yield. The structure of this new product was established through elemental analysis, infrared and n.m.r. spectroscopy.

EXAMPLE V

A slurry of 160 moles of potassium cyanate in 200 ml of dimethylformamide (DMF) is heated to 75° C in a nitrogen atmosphere. A solution of 300 moles of phenyl isocyanate and 150 moles of the n-butyl chloride in 100 ml of DMF is added dropwise over 1 hour. After stirring at temperature for an additional 1 hour, the DMF product solution is decanted away from the insoluble inorganic salts formed during the reaction. Removal of the DMF (distillation at reduced pressure) left a residue which is stirred well with water. The crude product is removed by filtration and analyzed by gas chromatography. The isolated product is found to be 1,3-diphenyl-5-n-butyl isocyanurate. The product is purified by recrystallization from 95 percent ethanol. The percent conversion (mole percent of phenyl isocyanate reacted) is 95. The yield is 49% +. The major by-product formed is potassium diphenyl isocyanurate which is readily separated from the formed 1,3-diphenyl-5-n-butyl isocyanurate by a simple extraction with water, the 1,3-diphenyl-5-n-butyl isocyanurate being completely insoluble in water.

EXAMPLE VI

The procedure of Example V is followed except that methyl iodide is used in place of n-butyl chloride and allyl isocyanate is used in place of phenyl isocyanate. The isolated product is found to be 1,3-diallyl-5-methyl isocyanurate. The product is purified by recrystallization from 95 percent ethanol. The yield is 96 percent.

What is claimed is:

1. A method of preparing unsymmetrically trisubstituted isocyanurates comprising forming a reaction mixture of an organic isocyanate corresponding to the formula R'NCO, an organic halide corresponding to the formula RX and an alkali or alkaline earth metal cyanate, and reacting the isocyanate with the halide and the metal cyanate in the presence of an aprotic solvent at a temperature and for a time to effect formation essentially of an isocyanurate corresponding to the formula

| Isocyanate | Product | (1) Crude yield, percent | (2) Pure yield, percent | (3) M.p., °C. |
|---|---|---|---|---|
| Tolylisocyanate | 1-benzyl-3,5-ditolylisocyanurate | 96.2 | 87.8 | 194–194.5 |
| p-Nitrophenylisocyanate | 1-benzyl-3,5-di-p-nitrophenylisocyanurate | 97.8 | 77.4 | 286–287.5 |
| p-Chlorophenylisocyanate | 1-benzyl-3,5-di-p-chlorophenylisocyanurate | 94.6 | 81.8 | 240.5–241 |
| p-Methoxyphenyl-isocyanate | 1-benzyl-3,5-di-p-methoxyphenylisocyanurate | 97.0 | 80.9 | 182–183 |

(1) Based on benzyl chloride; (2) recrystallized from ethanol; (3) all structures confirmed by infrared, n.m.r. and elemental analysis.

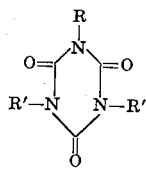

wherein, in each instance, R is an allyl, benzyl or a $C_1$ to $C_{12}$ alkyl radical, R' is a $C_1$–$C_{18}$ alkyl, alkene, alkyne, carbocyclic aryl or carbocyclic aralkyl radical, and X is a halogen, and wherein R and R' are different.

2. A method according to claim 1 wherein the molar ratio of organic isocyanate to organic halide to metal cyanate employed in carrying out the reaction is about 2:1:1.

3. A method according to claim 1 wherein the aprotic solvent is characterized in that it is a liquid under the conditions of the reaction, it has a relatively high dielectric constant, it is dipolar in that one part of the molecule has a more positive electrical charge relative to the other parts of the molecule thereby causing the molecule to act as a dipole, it is sufficiently inert so as not to enter into deleterious side reactions to any appreciable extent under the reaction conditions, and it does not possess hydrogen atoms capable of hydrogen bonding with or transferring to anions in solution in the reaction mixture.

4. A method according to claim 1 wherein the reaction is carried out under pressure in the range of about 0.1 to about 30 atmospheres.

5. A method according to claim 1 wherein the aprotic solvent is a member of the group consisting of N-alkyl pyrrolidones, dialkylamides, alkylacetamides, alkylphosphoramides, arylphosphoramides, alkylureas, alkylsulfoxide, arylsulfones, and nitriles, and mixtures thereof.

6. A method according to claim 1 wherein the reaction is carried out at a temperature of from about 25° to about 300°C.

7. A method according to claim 1 wherein the reaction is carried out under pressure in the range of from about 1 to about 10 atmospheres.

8. A method according to claim 1 wherein the aprotic solvent is dimethylformamide and the temperature employed is from about 75° to about 200°C.

9. A method according to claim 1 wherein the time of the reaction is from about 0.1 to about 48 hours.

10. A method according to claim 1 wherein separation of the formed isocyanurate from the major by-product of the reaction is achieved by a water extraction.

* * * * *